(12) United States Patent
Fang et al.

(10) Patent No.: US 11,582,492 B2
(45) Date of Patent: *Feb. 14, 2023

(54) HOSPITALITY PROPERTY MANAGEMENT TOOL AND SYSTEM AND METHOD FOR USE OF SAME

(71) Applicant: Enseo, LLC, Plano, TX (US)

(72) Inventors: William C. Fang, Plano, TX (US); Thomas R. Miller, Plano, TX (US); Vanessa Ogle, Fairview, TX (US)

(73) Assignee: Enseo, LLC, Plano, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/482,993

(22) Filed: Sep. 23, 2021

(65) Prior Publication Data

US 2022/0014797 A1    Jan. 13, 2022

Related U.S. Application Data

(63) Continuation of application No. 16/901,886, filed on Jun. 15, 2020, now Pat. No. 11,140,421, which is a
(Continued)

(51) Int. Cl.
| | |
|---|---|
| *H04N 21/214* | (2011.01) |
| *H04N 21/41* | (2011.01) |
| *H04N 21/25* | (2011.01) |
| *H04N 21/478* | (2011.01) |
| *H04N 21/436* | (2011.01) |

(Continued)

(52) U.S. Cl.
CPC ........ *H04N 21/2143* (2013.01); *H04N 21/25* (2013.01); *H04N 21/262* (2013.01); *H04N 21/4131* (2013.01); *H04N 21/436* (2013.01); *H04N 21/43615* (2013.01); *H04N 21/478* (2013.01); *H04N 21/8126* (2013.01); *H04N 21/8146* (2013.01)

(58) Field of Classification Search
CPC .. H04N 21/2143; H04N 21/25; H04N 21/262; H04N 21/4131; H04N 21/436; H04N 21/43615; H04N 21/478; H04N 21/8126; H04N 21/8146

See application file for complete search history.

(56) References Cited

U.S. PATENT DOCUMENTS

| | | |
|---|---|---|
| 5,661,517 A | 8/1997 | Budow et al. |
| 5,664,174 A | 9/1997 | Agrawal et al. |

(Continued)

*Primary Examiner* — Sumaiya A Chowdhury
(74) *Attorney, Agent, or Firm* — Scott Griggs; Griggs Bergen LLP (57) ABSTRACT

A hospitality property management tool and system and method for use of the same are disclosed. In one embodiment of the system, the system includes a set-top box located in a room at a hospitality establishment having multiple rooms. The set-top box stores various types of set-top box data and transmits the set-top box data to a remote server. The remote server receives and stores the set-top box data. The server may render a map view of the hospitality establishment based on obtained map data. The map view may include a graphical representation of the room and other rooms at the hospitality establishment. The server may annotate the graphical representation of the room with at least a portion of the set-top box data.

20 Claims, 7 Drawing Sheets

Related U.S. Application Data continuation of application No. 16/556,411, filed on Aug. 30, 2019, now Pat. No. 10,687,089, which is a continuation of application No. 15/982,725, filed on May 17, 2018, now Pat. No. 10,405,008, which is a continuation-in-part of application No. 15/824,766, filed on Nov. 28, 2017, now Pat. No. 10,123,056, which is a continuation of application No. 15/417,554, filed on Jan. 27, 2017, now Pat. No. 9,832,489, which is a continuation of application No. 15/074,067, filed on Mar. 18, 2016, now Pat. No. 9,560,388, which is a continuation of application No. 14/803,428, filed on Jul. 20, 2015, now Pat. No. 9,326,009, which is a continuation of application No. 14/294,123, filed on Jun. 2, 2014, now Pat. No. 9,088,828.

(60) Provisional application No. 62/508,166, filed on May 18, 2017, provisional application No. 61/829,932, filed on May 31, 2013.

(51) Int. Cl.
*H04N 21/262* (2011.01)
*H04N 21/81* (2011.01)

(56) References Cited

U.S. PATENT DOCUMENTS

| | | |
|---|---|---|
| 5,675,788 A | 10/1997 | Husick et al. |
| 5,742,816 A | 4/1998 | Barr et al. |
| 5,842,200 A | 11/1998 | Agrawal et al. |
| 6,029,176 A | 2/2000 | Cannon |
| 6,286,005 B1 | 9/2001 | Cannon |
| 9,088,828 B2 | 7/2015 | Ogle et al. |
| 9,326,009 B2 | 4/2016 | Ogle et al. |
| 9,560,388 B2 | 1/2017 | Ogle et al. |
| 9,832,489 B2 | 11/2017 | Ogle et al. |
| 10,405,008 B2 | 9/2019 | Fang et al. |
| 2004/0019513 A1 | 1/2004 | Colalancia |
| 2007/0050197 A1 | 3/2007 | Efron |
| 2008/0319807 A1 | 12/2008 | Weiss |
| 2010/0211489 A1 | 8/2010 | Zhang |
| 2010/0250707 A1 | 9/2010 | Dalley |
| 2012/0011033 A1* | 1/2012 | Salgia .................... G06Q 50/12 705/27.2 |
| 2012/0185300 A1* | 7/2012 | Dildy ................. G06Q 30/0202 705/26.7 |
| 2013/0328909 A1 | 12/2013 | Pacheco et al. |
| 2017/0046650 A1 | 2/2017 | Mulji |
| 2017/0142449 A1 | 5/2017 | Ogle et al. |
| 2018/0084285 A1 | 3/2018 | Ogle et al. |
| 2018/0249188 A1 | 8/2018 | Fang et al. |
| 2018/0270510 A1 | 9/2018 | Fang et al. |

* cited by examiner

HOSPITALITY PROPERTY MANAGEMENT TOOL AND SYSTEM AND METHOD FOR USE OF SAME

PRIORITY STATEMENT & CROSS-REFERENCE TO RELATED APPLICATIONS

This application is a continuation of U.S. patent application Ser. No. 16/901,886, entitled "Hospitality Property Management Tool and System and Method for Use of Same" filed on Jun. 15, 2020, in the names of William C. Fang, et al., now U.S. Pat. No. 11,140,421 issued on Oct. 5, 2021; which is a continuation of U.S. patent application Ser. No. 16/556,411, entitled "Hospitality Property Management Tool and System and Method for Use of Same" filed on Aug. 30, 2019, in the names of William C. Fang, et al., now U.S. Pat. No. 10,687,089 issued on Jun. 16, 2020; which is a continuation of U.S. patent application Ser. No. 15/982,725, entitled "Hospitality Property Management Tool and System and Method for Use of Same" filed on May 17, 2018, in the names of William C. Fang, now U.S. Pat. No. 10,405,008 issued on Sep. 3, 2019; which claims priority from U.S. Patent Application Ser. No. 62/508,166, entitled "Hospitality Property Management Tool and System and Method for Use of Same" filed on May 18, 2017, in the name of Vanessa Ogle; all of which are hereby incorporated by reference, in entirety, for all purposes. U.S. patent application Ser. No. 15/982,725, entitled "Hospitality Property Management Tool and System and Method for Use of Same," filed on May 17, 2018, now U.S. Pat. No. 10,405,008 issued on Sep. 20, 2018 is also a continuation-in-part of U.S. patent application Ser. No. 15/824,766 entitled "Set-Top Box with Interactive Portal and System and Method for Use of Same" filed on Nov. 28, 2017, in the names of Vanessa Ogle, et al., now U.S. Pat. No. 10,123,056 issued on Nov. 6, 2018; which is a continuation of U.S. patent application Ser. No. 15/417,554 entitled "Set-Top Box with Interactive Portal and System and Method for Use of Same" filed on Jan. 27, 2017 in the names of Vanessa Ogle, et al., now U.S. Pat. No. 9,832,489 issued on Nov. 28, 2017; which is a continuation of U.S. patent application Ser. No. 15/074,067 entitled "Set-Top Box with Interactive Portal and System and Method for Use of Same" filed on Mar. 18, 2016 in the names of Vanessa Ogle, et al., now U.S. Pat. No. 9,560,388 issued on Jan. 31, 2017; which is a continuation of U.S. patent application Ser. No. 14/803,428 entitled "Set-Top Box with Interactive Portal and System and Method for Use of Same" and filed on Jul. 20, 2015 in the names of Vanessa Ogle, et al., now U.S. Pat. No. 9,326,009 issued on Apr. 26, 2016; which is a continuation of U.S. patent application Ser. No. 14/294,123 entitled "Set-top Box with Interactive Portal and System and Method for Use of Same" and filed on Jun. 2, 2014 in the names of Vanessa Ogle, et al., now U.S. Pat. No. 9,088,828 issued on Jul. 21, 2015; which claims priority from U.S. Patent Application Ser. No. 61/829,932 entitled "On-Screen Display" and filed on May 31, 2013 in the name of Vanessa Ogle; all of which are hereby incorporated by reference, in entirety, for all purposes.

TECHNICAL FIELD OF THE INVENTION

This invention relates, in general, to the management of hospitality real estate and, in particular, to property management tools and systems and methods for use of the same for the operation, control, and oversight of hospitality properties, such as lodging establishments, motels, or hotels, for example.

BACKGROUND OF THE INVENTION

Without limiting the scope of the present invention, the background will be described in relation to property management in the hospitality industry, as an example. Property management in the hospitality industry requires a need for the asset to be cared for, monitored and accountability given for its useful life and condition. As property portfolios grow in the hospitality industry, the processes, systems and human resources required to manage the life cycle of all acquired property increases in complexity. As a result of limitations in existing technology, there is a need for improved systems and methods of providing understanding and visibility into the management of hospitality environments.

SUMMARY OF THE INVENTION

It would be advantageous to achieve understanding and visibility into the management of hospitality environments. It would also be desirable to enable a computer-based solution that would enable property management tools to improve the operation, control, and oversight of hospitality properties, such as lodging establishments, motels, or hotels. To better address one or more of these concerns, property management tools and systems and methods for use of the same, are disclosed that are applicable to the hospitality industry. In one embodiment of the system, the system includes a set-top box located in a room at a hospitality establishment having multiple rooms. The set-top box stores various types of set-top box data and transmits the set-top box data to a remote server. The remote server receives and stores the set-top box data. The server may render a map view of the hospitality establishment based on obtained map data. The map view may include a graphical representation of the room and other rooms at the hospitality establishment. The server may annotate the graphical representation of the room with at least a portion of the set-top box data. These and other aspects of the invention will be apparent from and elucidated with reference to the embodiments described hereinafter.

BRIEF DESCRIPTION OF THE DRAWINGS

For a more complete understanding of the features and advantages of the present invention, reference is now made to the detailed description of the invention along with the accompanying figures in which corresponding numerals in the different figures refer to corresponding parts and in which.

DETAILED DESCRIPTION OF THE INVENTION

While the making and using of various embodiments of the present invention are discussed in detail below, it should be appreciated that the present invention provides many applicable inventive concepts, which can be embodied in a wide variety of specific contexts. The specific embodiments discussed herein are merely illustrative of specific ways to make and use the invention, and do not delimit the scope of the present invention.

Figure 1:
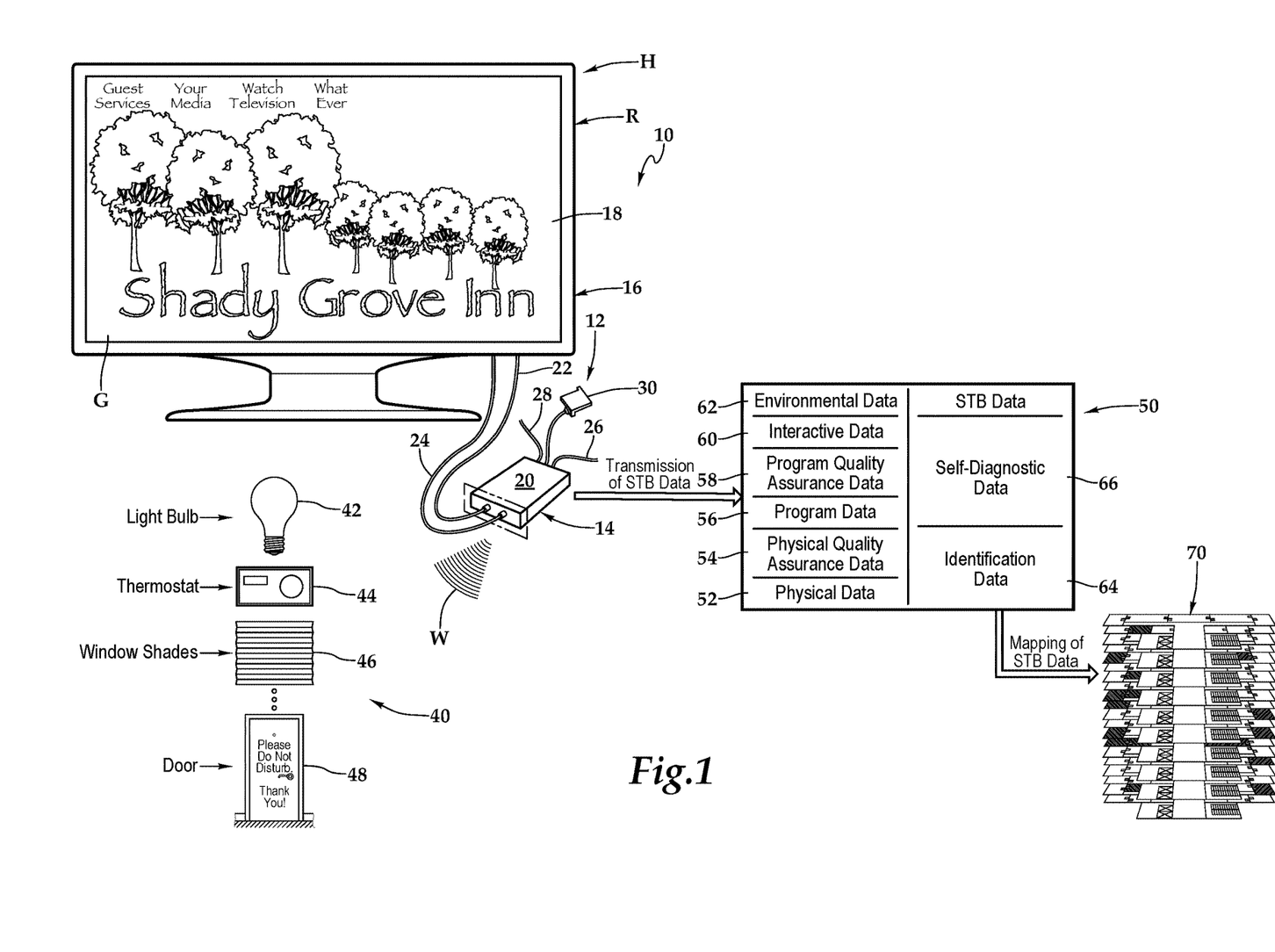
FIG. 1 is a schematic diagram depicting one embodiment of a system for providing hospitality property management according to the teachings presented herein.

Referring initially to FIG. 1, therein is depicted one embodiment of a system 10 for the management of a hospitality lodging establishment. The hospitality lodging establishment, which may be referred to as a hospitality property, may be a furnished multi-family residence, dormitory, lodging establishment, hotel, hospital, or other multi-unit environment. As shown, by way of example and not by way of limitation, the hospitality environment is depicted as a hospitality establishment H having various rooms, including room R, and spaces S. As illustrated, the hospitality establishment H is a hotel. An entertainment center 12 includes a set-top box 14, which is communicatively disposed with various amenities associated with the hospitality environment, including a display 16. As shown, the display 16 is depicted as a television having a screen 18, which is showing a guest welcoming portal G. It should be appreciated however, that the display 16 may also be any electronic visual display device, for example. Entertainment centers, like the entertainment center 12, may be deployed throughout the rooms R and spaces S of the hospitality establishment H. The entertainment center 12 is depicted as including the set-top box 14 and the display 16. It should be appreciated however that the entertainment center 12 may include any combination of electronic appliances, components, and devices and, in particular, any combination of electronic appliances, components, and devices found in the hospitality environment.

As shown, with respect to the set-top box 14 having a housing 20, and the display 16, a connection, which is depicted as an HDMI connection 22, connects the set-top box 14 to the display 16. Other connections include a power cable 24 coupling the set-top box 14 to a power source, a coaxial cable 26 coupling the set-top box 14 to an external cable source, and a category five (Cat 5) cable 28 coupling the set-top box 14 to an external pay-per-view source at a hotel or other lodging establishment, for example. As shown, the set-top box 14 may include a dongle 30 providing particular technology and functionality extensions thereto. That is, the set-top box 14 may be a set-top box-dongle combination in one embodiment. More generally, it should be appreciated that the cabling connected to the set-top box 14 will depend on the environment and application, and the cabling connections presented in FIG. 1 are depicted for illustrative purposes. Further, it should be appreciated that the positioning of the set-top box 14 will vary depending on environment and application and, with certain functionality, the set-top box 14 may be placed more discretely behind the display 16. Moreover, it should be appreciated that the set-top box 14 and the display 16 may be at least partially or fully integrated. The set-top box 14 communicates wirelessly, as indicated by wireless signaling W, with various amenities 40 within an environment of the room R. As shown, the amenities may include lighting 42, a thermostat 44, window shades 46, and a door indication 48 for "Please Do Not Disturb."

The set-top box 12 collects various set-top box data 50 including physical data 52, physical quality assurance data 54, program data 56, program quality assurance data 58, interactive data 60, and environmental data 62. Additionally, the set-top box data 50 includes identification data 64 identifying the set-top box 12 as well as self-diagnostic data 66. In one embodiment, the physical data 52 includes the actual hardware specifications and arrangement of cable connections at the time of installation. The physical quality assurance data 54 may be physical state data relating to a current condition of the hardware and cable connections. The program data 56 may include information about the system software that engages the set-top boxes hardware and information about the application software that provides functionality relating to a guest's or hotel's interest, for example. The program quality assurance data 58 may be software state data relating to the current operations of the system software and the application software. In one embodiment, the interactive data 60 includes information about the display-based interactions of a guest with the set-top box. The environmental data 62 includes information about the non-display-based interactions of a guest with the set-top box. In one implementation, the identification data 64 may include the location of the set-top box as well as other information derived from the physical data 52 and the program data 56, which identifies the set-top box. The self-diagnostic data 66 relates to an application running automatically at a regular interval or continuously, for example, that detects faults—typically before becoming serious—in the physical data 52, the physical quality assurance data 54, the program data 56, the program quality assurance data 58, the interactive data 60, or the environmental data 62, for example.

By way of example, and not by way of limitation, the physical data may be processor specifications, memory specifications, storage specifications, wireless specifications, firmware versions, connection to display by type, connection to display by model number, network addressing, MAC addresses, or the like. The physical quality assurance data may be online/offline status, power state, display control status, display connection status, HDMI interface status, control interface status, memory usage, unit up-time, hardware installation progress, or the like. The program data may be user interface software version, operating system version, settings version, welcome menu version, and software configuration, or the like. The program quality assurance data may be program guide status, debug console log, software usage, and software installation progress, or the like. The interactive data may be guest configuration data, television channel viewing, program viewing, Internet history, program guide interaction, or the like. The environmental data may be amenity interaction, lighting status, thermostat status, window shades status, door status, or the like. The identification data may be the serial number and addressing information gathered from the physical data, software identification information gathered from the program data, room number assigned to the set-top box, or the like. The self-diagnostic data may be percent online, display output errors, High Bandwidth Digital Content Protection (HBDCP) errors, self-test results, set-top box health reports, or the like.

As will be discussed in further detail hereinbelow, a map view 70 of the hospitality establishment H, including room R, may be rendered by the system 10 as part of and following the collection of the set-top box data 50. More particularly, in one operational embodiment of the system, as discussed, the set-top box stores various types of set-top box data 50 and transmits the set-top box data 50. The system 10 receives and stores the set-top box data. The system 10 may render the map view 70 of the hospitality establishment based on obtained map data, as will be discussed in more detail hereinbelow. The map view may include a graphical representation of the room and other rooms at the hospitality establishment. The system 10 may annotate the graphical representation of the room with at least a portion of the set-top box data 50.

The set-top box data 50 has uses other than the rendering of the map view 70. By way of example, collection of this data permits hotel guests to tailor their specific program guide and to store those preferences for future hotel stays by providing a means to learn a guest's preferences in a central database then store those preferences for future stays thus allowing the guest to reuse the preferences in future stays regardless of the television make and model in the hotel room. Stored television preferences can be stored and retrieved using two methods. First, in a hotel brand database and installed in a specific guest room based on loyalty program membership identifier. These preferences would be automatically provided to the set-top box 14 as the guest checks into the hotel or self-applied by the guest through registration in an internet-based system accessible to guests during their hotel stay at any property so equipped.

Set-top box data 50 may be collected for an application such as an adaption program guide that allows guests to customize the interactive program guide at his or her set-top box 14. By way of example, and not by way of limitation, the adaption program guide may include the following:

Presentation of a sub-set of the items available in the interactive program guide such as only sports channels, a specific list of channels of interest to the specific guest, only over-the-top programming or any combination of these items. Items for display may be selectable either as discrete items available for yes/no election by the guest or through groups of like items or services that may be selected as a group for inclusion or elimination from the interactive program guide.

Presentation of the items in the interactive program guide in a specific order such as sports channels first followed by over-the-top applications or any combination of items and services available in the system. Changes in font size, background color or other graphical features as necessary to improve the system usability for individuals with accessibility challenges may also be included.

Individual guest settings are stored in a database of guest settings indexed by a master index record that could be either the guest's loyalty program membership identifier or a separate identifier such as the guest's e-mail address. In some situations, a hotelier may choose to use their own system to maintain these records while other hoteliers may choose to use a database system provided by an external service.

Guest specific adaptations to the specific room's interactive program guide can be applied through automated features utilizing the hotel's property management system and its ability to store hotel loyalty membership information for a specific guest. The teachings herein provide a feature to retrieve a guest's interactive program guide adaptations they created at a previous hotel stay and automatically apply those settings to a current hotel stay by retrieving the guest's hotel loyalty membership number from the hotel property management system. Once the loyalty number is retrieved, the invention would use that number to look up, retrieve and then apply the guest's interactive program guide adaptations stored in the system from a previous stay.

Alternatively, some hoteliers may choose to use a completely separate and non-hotel brand specific database to manage guest specific adaptations to the interactive program guide. In this implementation, guests would log into the system in their room using the television system in any equipped hotel whereupon the system would download their specific customizations, which would immediately take effect on the television(s) in their rooms. Any customizations made while the guest was logged into the system may then be recorded in the system database and available for future guest stays at any equipped hotel.

Guests personal adaptations may be recorded by either of two methods. These methods can be used independently or together to create and store a guest's personal adaptations. Using the first method, guests may select from an on-screen presentation on the guest's television in their room, the channels and services they want to include in their customized interactive program guide. This presentation is constructed using a variety of graphical presentations that could include checkboxes, radio buttons, and checklists or other presentations. Guests may then accept the selected items for display on their television. If the guest was a hotel loyalty program member and the hotel has elected to use this feature, the guest's settings may be saved in a database associated with the guest's loyalty membership number. This is in addition to preserving the newly customized settings for the duration of the guest's current stay. If the hotel brand elects to use a brand independent database, the guest's customizations would then be stored in that database using the guest's login information as the record key.

Using the second method, the system may automatically prioritize channels and services based on guest channel usage. Prioritization may be based on multiple factors such as but not limited to:

Channels or services elected for viewing by the guest.
Duration of viewing by the guest of particular channels or services.
Associated channels and services similar to channels or services viewed by the guest based on selection or duration by the guest.

Figure 2A:
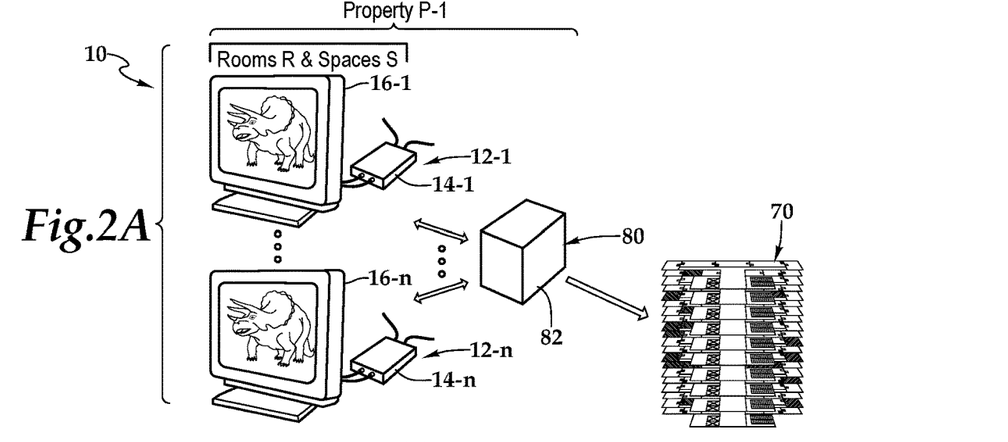
FIG. 2A is a schematic diagram depicting one embodiment of the system of FIG. 1 within an on-property deployment.

Referring now to FIG. 2A, the system 10 may be deployed such that a server 80 is co-located on the property P-1 with the entertainment centers 12-1 . . . 12-n. As shown, each of the entertainment centers 12-1 . . . 12-n may respectively include set-top boxes 14-1 . . . 14-n and displays 16-1 . . . 16-n. As shown, the server 80 includes a housing 82 having various components and software therein as will be discussed in FIG. 5, FIG. 6, and FIG. 7. In one embodiment, the set-top boxes 14-1 . . . 14-n send the set-top box data periodically as part of regular broadcasts or in response to an inquiry made from the remote server 80. The remote server 80 receives the set-top box data 50 from the set-top boxes 14-1 . . . 14-2.

The server 80 may render a map view 70 of the hospitality establishment based on obtained map data. Additionally, the server 80 may render the map view 70 of the hospitality establishment with annotations based on the set-top box data as discussed herein. In some embodiments, the map view 70 may include a graphical representation of one or more rooms of the hospitality establishment that are annotated with set-top box data relative to the physical data, the physical quality assurance data, the program data, the program quality assurance data, the interactive data, the environmental data, the identification data, and/or the self-diagnostic data. It should be appreciated that the server 80 may be located on a single property to serve one or more televisions thereon. Further, it should be appreciated that the server 80 may be remotely located to serve multiple properties having multiple televisions.

Figure 2B:
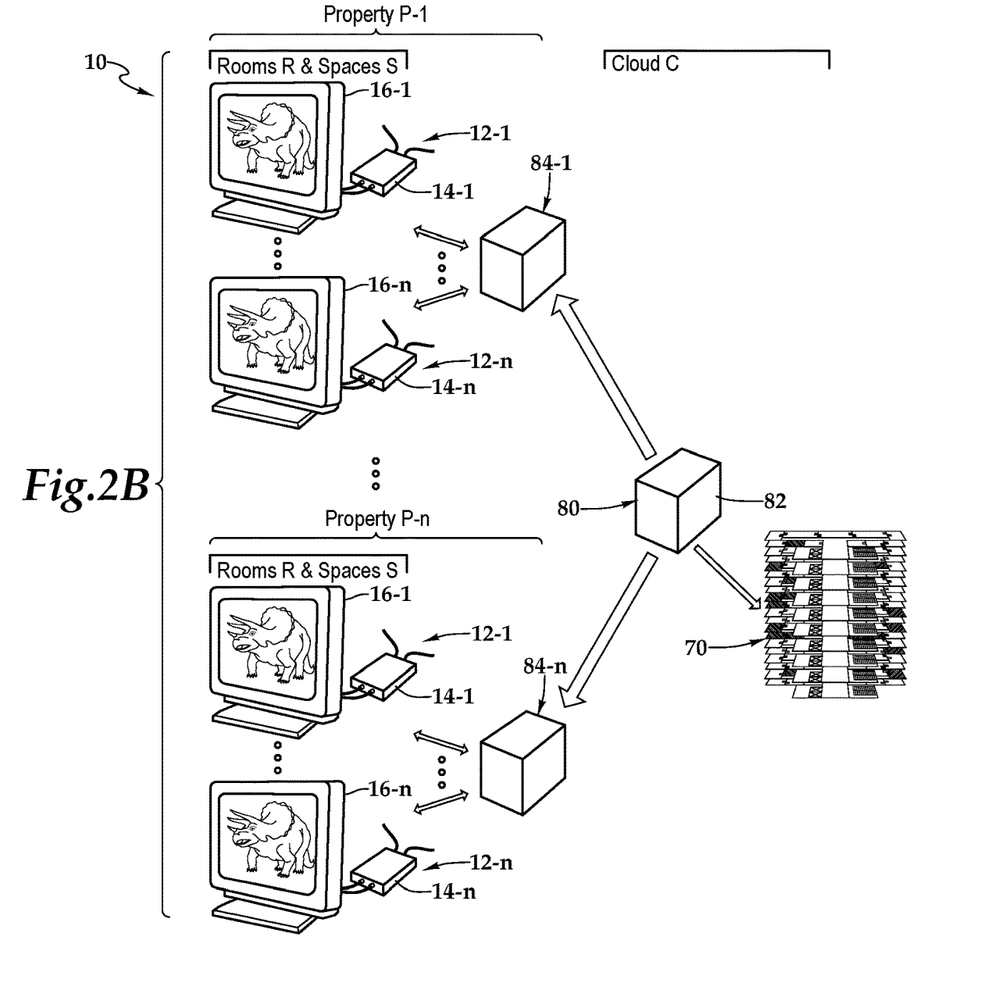
FIG. 2B is a schematic diagram depicting one embodiment of the system of FIG. 1 within a cloud-computing deployment.

Referring to FIG. 2B, the system 10 may be deployed such that the server 80, having the housing 82, is located remotely within cloud C relative to the entertainment centers 12-1 . . . 12-n, which are located at properties P-1 through P-n. As shown, each of the entertainment centers 12-1 . . . 12-n may respectively include set-top boxes 14-1 . . . 14-n and displays 16-1 . . . 16-n. In particular, the server 80 may be located remotely relative to the entertainment centers 12-1 . . . 12-n such that a property headend 84-1 . . . 84-n is interposed between the server 80 and the entertainment centers 12-1 . . . 12-n. As shown, in this implementation, the property headend 84-1 . . . 84-n is co-located with the entertainment centers 12-1 . . . 12-n at a respective property, P-1 through P-n. The server 80 may render a map view 70 of the hospitality establishment that may be annotated with set-top box data as discussed herein.

Referring to FIG. 3A, FIG. 3B, FIG. 3C, and FIG. 4, as used herein, set-top boxes, back boxes and set-top/back boxes may be discussed as set-top boxes. By way of example, the set-top box 14 may be a set-top unit that is an information appliance device that generally contains set-top box functionality including having a television-tuner input and displays output through a connection to a display or television set and an external source of signal, turning by way of tuning the source signal into content in a form that can then be displayed on the television screen or other display device. Such set-top boxes are used in cable television, satellite television, and over-the-air television systems, for example.

Figure 3A:
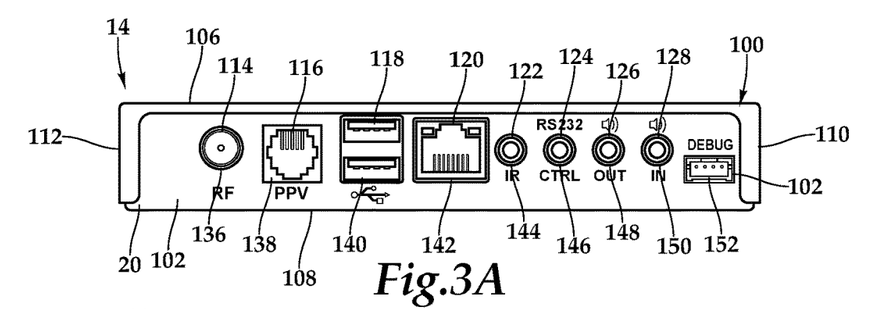
FIG. 3A is a wall-facing exterior elevation view of one embodiment of the set-top box depicted in FIG. 1 in further detail.
Figure 3B:
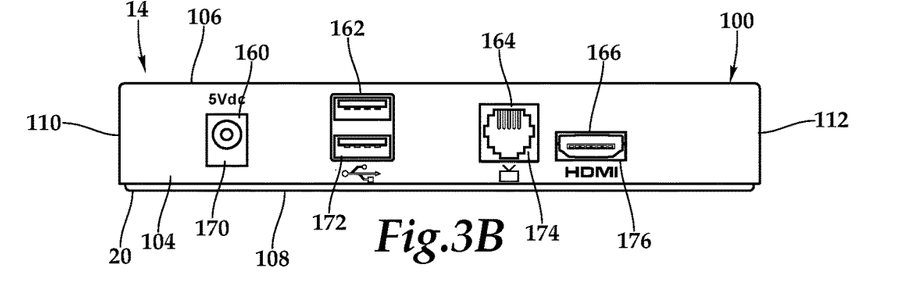
FIG. 3B is a television-facing exterior elevation view of the set-top box depicted in FIG. 1.
Figure 3C:
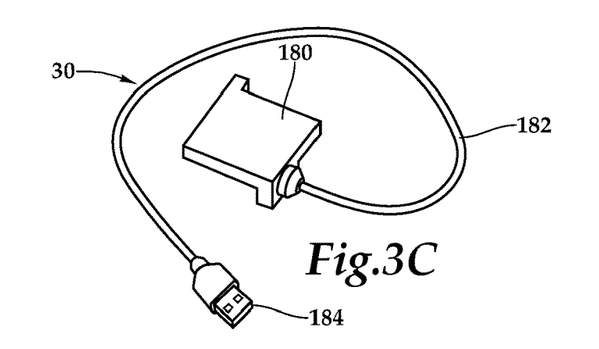
FIG. 3C is a front perspective view of a dongle depicted in FIG. 1 in further detail.

The set-top box 14 includes a housing 20 including a panel 100 and a rear wall 102, front wall 104, top wall 106, bottom base 108, and two sidewalls 110, 112. It should be appreciated that front wall, rear wall, and side wall are relative terms used for descriptive purposes and the orientation and the nomenclature of the walls may vary depending on application. The front wall includes various ports, ports 114, 116, 118, 120, 122, 124, 126, 128, and 130 that provide interfaces for various interfaces, including inputs and outputs. In one implementation, as illustrated, the ports 114 through 130 include inputs 132 and outputs 134 and, more particularly, an RF input 136, a RJ-45 input 138, universal serial bus (USB) input/outputs 140, an Ethernet category 5 (Cat 5) coupling 142, an internal reset 144, an RS232 control 146, an audio out 148, an audio in 150, and a debug/maintenance port 152. The front wall 104 also includes various inputs 132 and outputs 134. More particularly, ports 160, 162, 164, and 166 include a 5V dc power connection 170, USB inputs/outputs 172, an RJ-45 coupling 174, and an HDMI port 176. It should be appreciated that the configuration of ports may vary with the set-top box depending on application and context. As previously alluded to, the housing 20 may include a housing-dongle combination including, with respect to the dongle 30, a unit 180 having a cable 182 with a set-top box connector 184 for selectively coupling with the set-top box 14.

Figure 4:
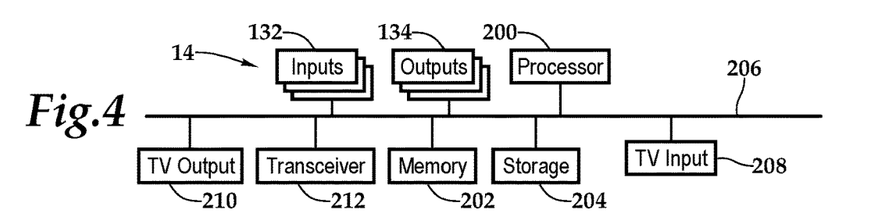
FIG. 4 is a functional block diagram depicting one embodiment of the set-top box presented in FIGS. 3A and 3B.

Within the housing 20, a processor 200, memory 202, storage 204, the inputs 132, and the outputs 134 are interconnected by a bus architecture 206 within a mounting architecture. It should be understood that the processor 200, the memory 202, the storage 204, the inputs 132, and the outputs 134 may be entirely contained within the housing 20 or the housing-dongle combination. The processor 200 may process instructions for execution within the computing device, including instructions stored in the memory 202 or in storage 204. The memory 202 stores information within the computing device. In one implementation, the memory 202 is a volatile memory unit or units. In another implementation, the memory 202 is a non-volatile memory unit or units. Storage 204 provides capacity that is capable of providing mass storage for the set-top box 14. Various inputs 132 and outputs 134 provide connections to and from the computing device, wherein the inputs 132 are the signals or data received by the set-top box 14, and the outputs 134 are the signals or data sent from the set-top box 14. A television content signal input 208 and a television output 210 are also secured in the housing 20 in order to receive content from a source in the hospitality property and forward the content, including external content such as cable and satellite and pay-per-view (PPV) programing, to the television located within the hotel room.

A transceiver 212 is associated with the set-top box 14 and communicatively disposed with the bus 206. As shown the transceiver 212 may be internal, external, or a combination thereof to the housing. Further, the transceiver 212 may be a transmitter/receiver, receiver, or an antenna for example. Communication between various amenities in the hotel room and the set-top box 14 may be enabled by a variety of wireless methodologies employed by the transceiver 212, including 802.11, 3G, 4G, Edge, WiFi, ZigBee, near field communications (NFC), Bluetooth low energy and Bluetooth, for example. Also, infrared (IR) may be utilized.

The memory 202 and storage 204 are accessible to the processor 200 and include processor-executable instructions that, when executed, cause the processor 200 to execute a series of operations. The processor-executable instructions cause the processor to analyze the set-top box data for defaults and store resultant self-diagnostic data. The processor-executable instructions also cause the processor to store the set-top box data. The processor-executable instructions may also cause the processor to send the set-top box data, or a portion thereof, and to send the self-diagnostic data either separately or with and as part of the set-top box data. The set-top box data may be sent periodically or continuously or in response to a request from the server 80, for example.

Figure 5:
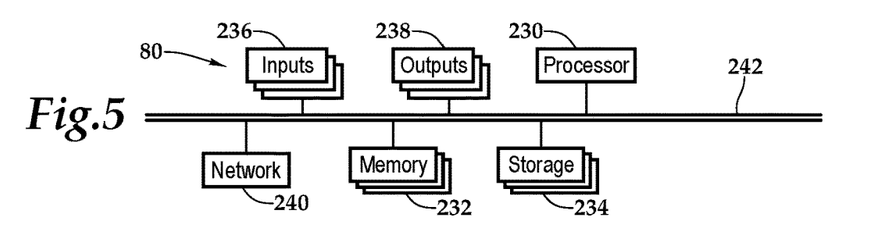
FIG. 5 is a functional block diagram depicting one embodiment of a server presented in FIGS. 2A and 2B.

Referring now to FIG. 5, one embodiment of the server 80 as a computing device includes a processor 230, memory 232, storage 234, inputs 236, outputs 238, and a network adaptor 240 interconnected with various buses 242 in a common or distributed, for example, mounting architecture. In other implementations, in the computing device, multiple processors and/or multiple buses may be used, as appropriate, along with multiple memories and types of memory. Further still, in other implementations, multiple computing devices may be provided and operations distributed therebetween. The processor 230 may process instructions for execution within the server 80, including instructions stored in the memory 232 or in storage 234. The memory 232 stores information within the computing device. In one implementation, the memory 232 is a volatile memory unit or units. In another implementation, the memory 232 is a non-volatile memory unit or units. Storage 234 includes capacity that is capable of providing mass storage for the server 80. Various inputs 236 and outputs 238 provide connections to and from the server 80, wherein the inputs 236 are the signals or data received by the server 80, and the outputs 238 are the signals or data sent from the server 80. The network adaptor 240 couples the server 80 to a network such that the server 80 may be part of a network of computers, a local area network (LAN), a wide area network (WAN), an intranet, a network of networks, or the Internet, for example.

The memory 232 and storage 234 are accessible to the processor 230 and include processor-executable instructions that, when executed, cause the processor 230 to execute a series of operations. In one embodiment, the processor-executable instructions cause the processor to receive the set-top box data from the set-top box as well as receive the self-diagnostic data from the set-top box. The processor-executable instructions may then cause the processor to store the set-top box data from the set-top box in a database, which may be associated with the storage. The self-diagnostic data from the set-top box may also be caused to be stored in the database. The processor-executable instructions then cause the processor to render a map view of the hospitality establishment based on obtained map data. As previously discussed, the map view may include a graphical representation of the room and a plurality of other rooms at the hospitality establishment. The processor-executable instructions may then access the database and annotate the graphical representation of the room with at least a portion of the set-top box data.

In some embodiments, the processor-executable instructions cause the processor to render a map view of the hospitality establishment based on obtained map data and the map view may include a graphical representation of the room and other rooms at the hospitality establishment. The processor-executable instructions, when executed, may cause the processor to render a 3-D perspective view of the hospitality establishment, a multi-floor view of the hospitality establishment, a 2-D top plan view of at least a portion the hospitality establishment, or a map view of a floor of the hospitality establishment, for example. The map view may be a virtual model of at least a portion of the physical body of the hospitality establishment, including a virtual model of the physical body of the hospitality establishment.

In some embodiments, the processor-executable instructions cause the processor to at least partially integrate or at least partially combine multiple portions of the set-top box data into the graphical representation of the room. The processor-executable instructions may also include instructions that cause the processor to implement a map application configured to provide a user interface and obtain instructions from a user on the desired map view and annotations.

Figure 6:
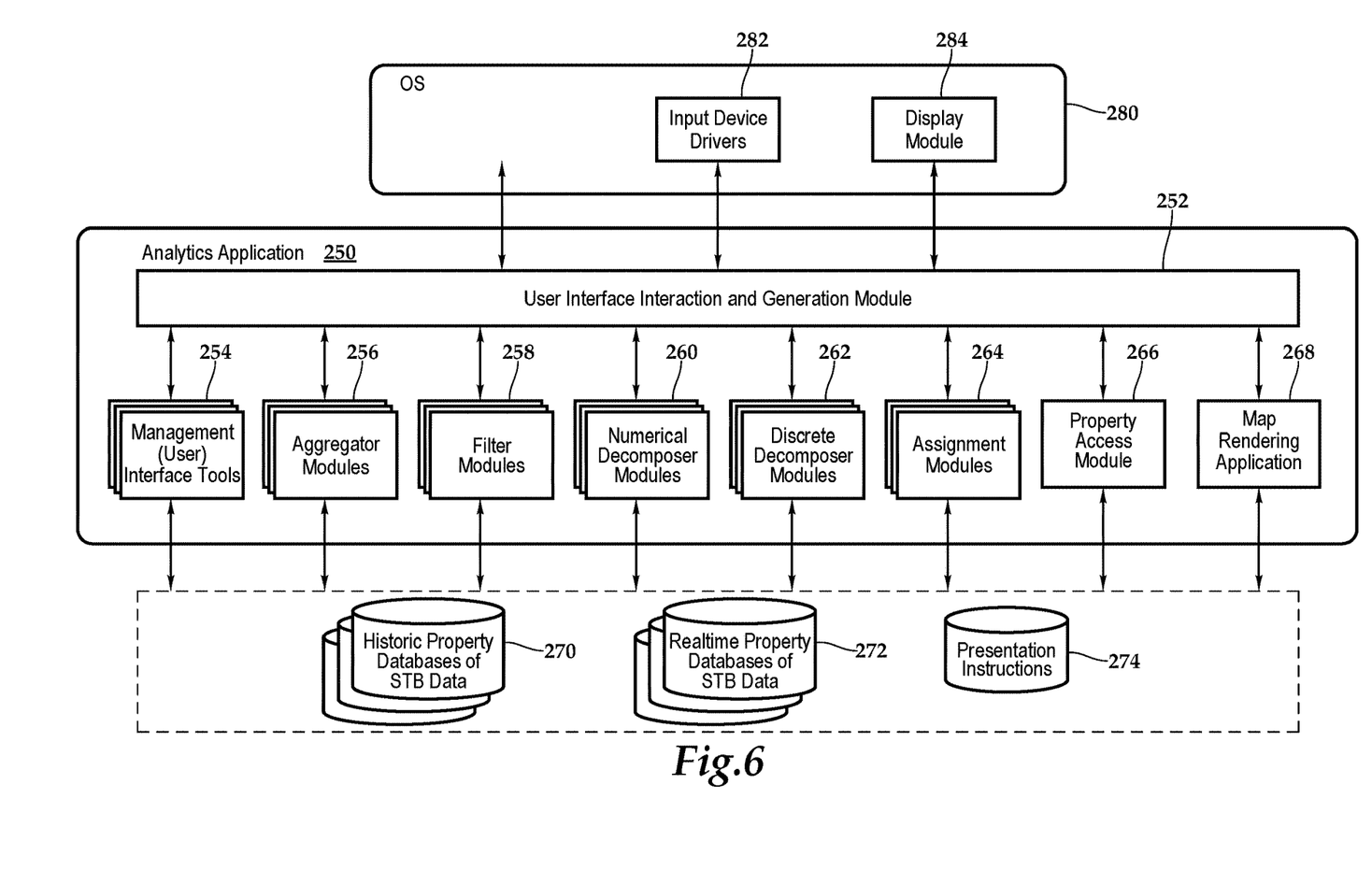
FIG. 6 is a conceptual module diagram depicting a software architecture of an analytics application of some embodiments.

FIG. 6 conceptually illustrates the software architecture of an analytics application 250 of some embodiments that may render the map view 70 of the hospitality establishment H. In some embodiments, the analytics application 250 is a stand-alone application or is integrated into another application, while in other embodiments the application might be implemented within an operating system 280. Furthermore, in some embodiments, the analytics application 250 is provided as part of a server-based solution or a cloud-based solution. In some such embodiments, the application is provided via a thin client. That is, the application runs on a server while a user interacts with the application via a separate machine remote from the server. In other such embodiments, the application is provided via a thick client. That is, the application is distributed from the server to the client machine and runs on the client machine.

The analytics application 250 includes a user interface (UI) interaction and generation module 252, management (user) interface tools 254, aggregator modules 256, filter modules 258, numerical decomposer modules 260, discrete decomposer modules 262, assignment modules 264, property access module 266, and a map rendering application 268. The analytics application 250 has access to historic property databases of set-top box data 270, real-time property databases of set-top box data 272, and presentation instructions 274, which presents instructions from the operation of the analytics operation 250. In some embodiments, storages 270, 272, and 274 are all stored in one physical storage. In other embodiments, the storages 270, 272, 274 are in separate physical storages, or one of the storages is in one physical storage while the other is in a different physical storage.

The UI interaction and generation module 252 generates a user interface that allows the end user to specify parameters that may be utilized to generate an annotated map view of the hospitality establishment, which may include elements of a heat map. Prior to the generation of an annotated map view of the hospitality establishment, the aggregator modules 256 may be executed to obtain instances of set-top box data. In other instances, the set-top box data is continually provided to the analytics application 250 such that the aggregator modules 256 do not have to obtain instances of set-top box data proactively. The set-top box data may also be filtered by the filter modules 258. The aggregator modules 256 and the filter modules 258 cooperate, in combination, to gather the desired set-top box data.

At this time, the parameters have been established for the annotated map view of the hospitality establishment by default or by an end user utilizing the management (user) interface tools 254. The numerical decomposer modules 260 may be executed to numerically decompose instances or summaries of set-top box data gathered by the aggregator modules 256 and the filter modules 258 by applying the selected performance characteristic or selected performance characteristics to the instances of the set-top box data. The discrete decomposer modules 262 may be executed to containerize the decomposed set-top box data. In this manner, multiple containers may be defined that each have a range of values. The assignment modules 264 may be executed to assign a pre-map annotation element to each of the multiple containers. The property access module 266 may be executed to obtain data from the historic property databases of set-top box data 270 or the real-time property databases of set-top box data 272. The map rendering application 268 may be executed to call a map rendering application 300 of FIG. 7, for example.

In the illustrated embodiment, FIG. 6 also includes an operating system 280 that includes input device driver(s) 282 and a display module 284. In some embodiments, as illustrated, the input device drivers 282 and display module 284 are part of the operating system 280 even when the analytics application 250 is an application separate from the operating system 280. The input device drivers 282 may include drivers for translating signals from a keyboard, mouse, touchpad, tablet, touch screen, gyroscope or accelerometer, for example. A user interacts with one or more of these input devices, which send signals to their corresponding device driver. The device driver then translates the signals into user input data that is provided to the UI interaction and generation module 252.

Figure 7:
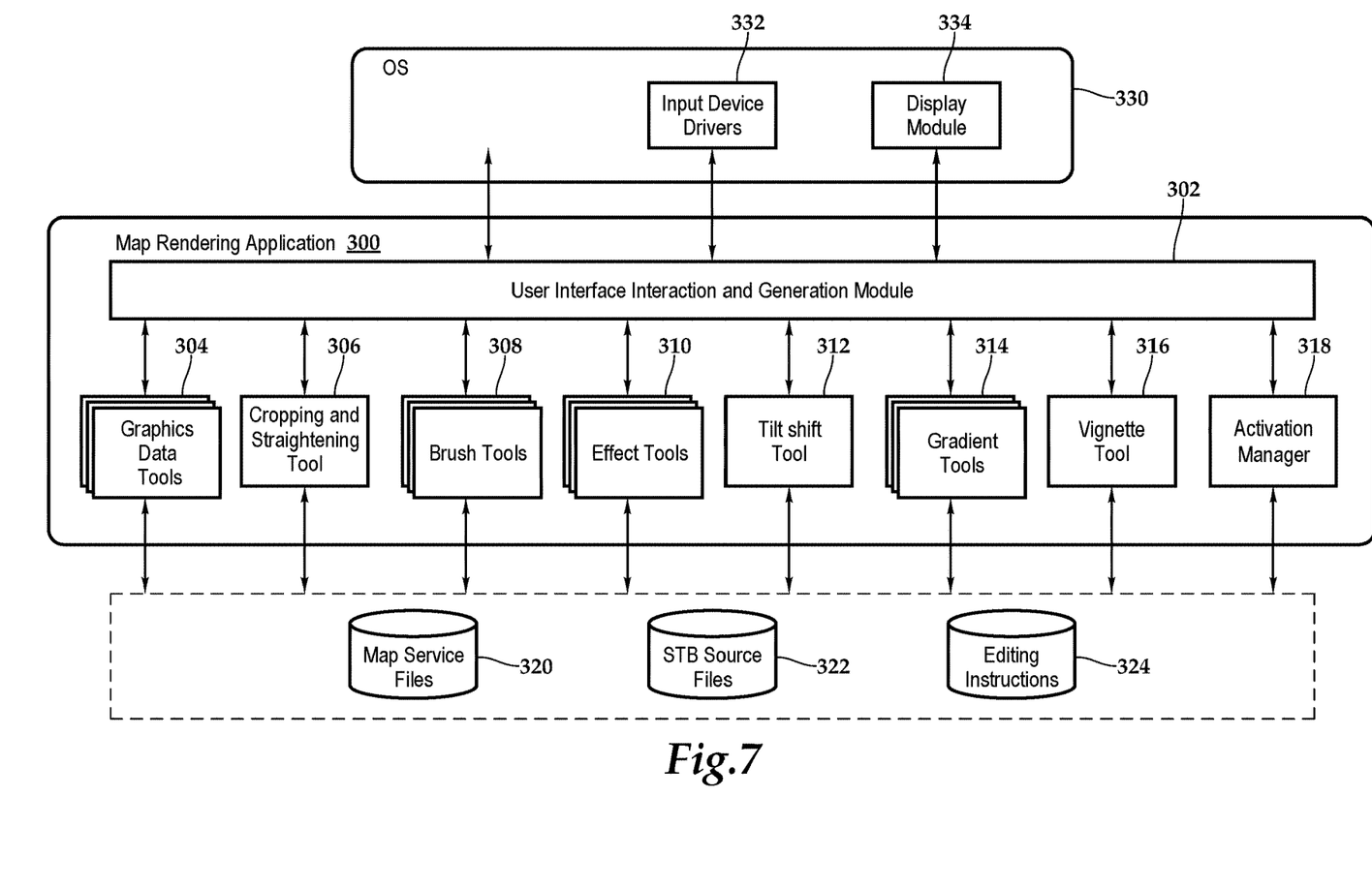
FIG. 7 is a conceptual module diagram depicting a software architecture of an image viewing, editing, and organization application of some embodiments.

FIG. 7 conceptually illustrates the software architecture of a map rendering application 300 of some embodiments that may render the map view 70 of the hospitality establishment H. In some embodiments, the map rendering application 300 is a stand-alone application or is integrated into another application, while in other embodiments the application might be implemented within an operating system. Furthermore, in some embodiments, the map rendering application 300 is provided as part of a server-based solution or a cloud-based solution. In some such embodiments, the application is provided via a thin client. That is, the application runs on a server while a user interacts with the application via a separate machine remote from the server. In other such embodiments, the application is provided via a thick client. That is, the application is distributed from the server to the client machine and runs on the client machine.

The map rendering application 300 includes a UI interaction and generation module 302, graphics data tools 304, a cropping and straightening tool 306, brush tools 308, effect tools 310, a tilt shift tool 312, gradient tools 314, a vignette tool 316, and an activation manager 318. The image editing application has access to map service files 320, set-top box source files 322, and editing instructions 324. In some embodiments, the map service files may be vector graphics data files with texture identifiers or two or three dimensional map image files specified in one or more map tiles that may be raster-based map tiles, for example. The map service files 320 create a virtual model of the physical body of the hospitality establishment H based on definitions derived from any GIS resources, such as a geodatabase, address location map document or geoprocess model, or any two- or three-dimensional CAD-based drawings and plans.

The set-top box source files 322 store operational instructions for processing set-top box data. The editing instructions 324 store the image editing operations that the map rendering application 300 performs as a set of instructions. The map rendering application 300 uses these set of instructions to generate new images based on the original data stored in the source files. In some embodiments, the map image files and/or media content data are stored as .mov, .avi, .jpg, .png, .gif, pdf, .mp3, .bmp, .wav, .txt, .tiff, etc. files in the map service files 320 and set-top box source files 322. In some embodiments, storages 320, 322, and 324 are all stored in one physical storage. In other embodiments, the storages 320, 322, 324 are in separate physical storages, or one of the storages is in one physical storage while the other is in a different physical storage.

In the illustrated embodiment, FIG. 7 also includes an operating system 330 that includes input device driver(s) 332 and a display module 334. In some embodiments, as illustrated, the device drivers 332 and display module 334 are part of the operating system 330 even when the image editing application is an application separate from the operating system. The input device drivers 332 may include drivers for translating signals from a keyboard, mouse, touchpad, tablet, touch screen, gyroscope, accelerometer, etc. A user interacts with one or more of these input devices, which send signals to their corresponding device driver. The device driver then translates the signals into user input data that is provided to the UI interaction and generation module 300.

The present application describes a graphical user interface that provides users with numerous ways to perform different sets of operations and functionalities. By either executing a pre-determined series of editing instructions on a pre-determined set of media source files or receiving a selection of media processing operations, the present map rendering application 300 provides for a map view of the hospitality establishment with the appropriate annotations of set-top box data.

Figure 8A:
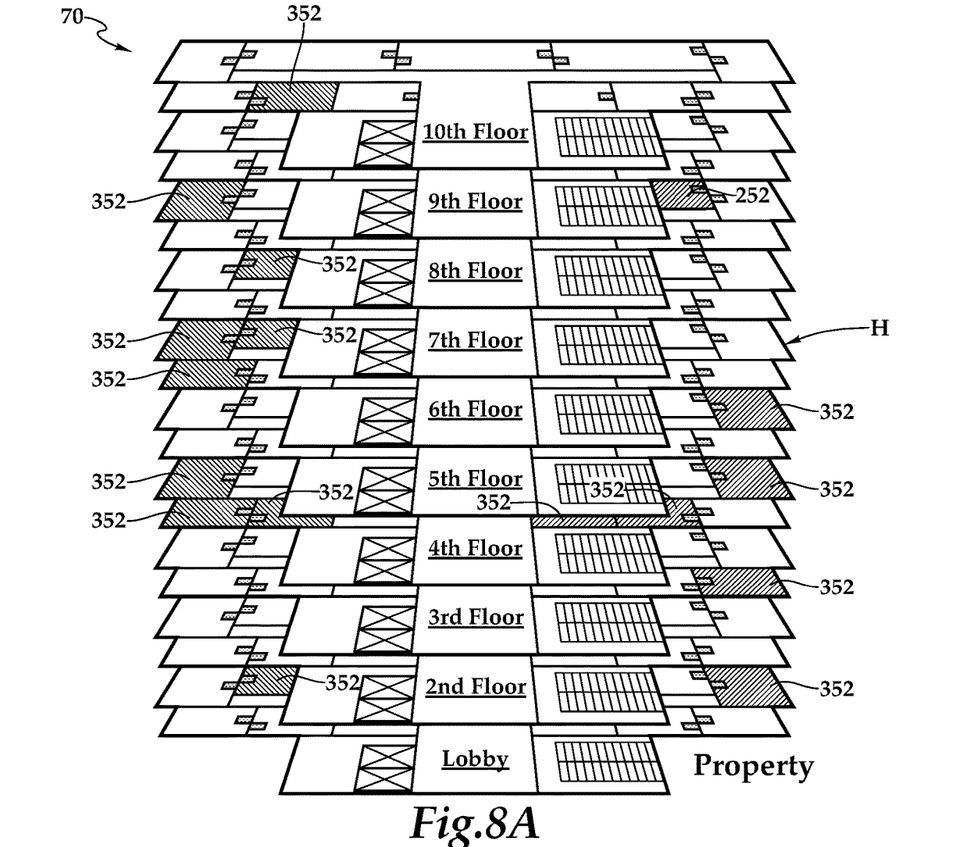
FIG. 8A is a schematic diagram depicting one embodiment of a map representation of a hospitality lodging establishment utilizing one embodiment of a hospitality property management tool presented herein.
Figure 8B:
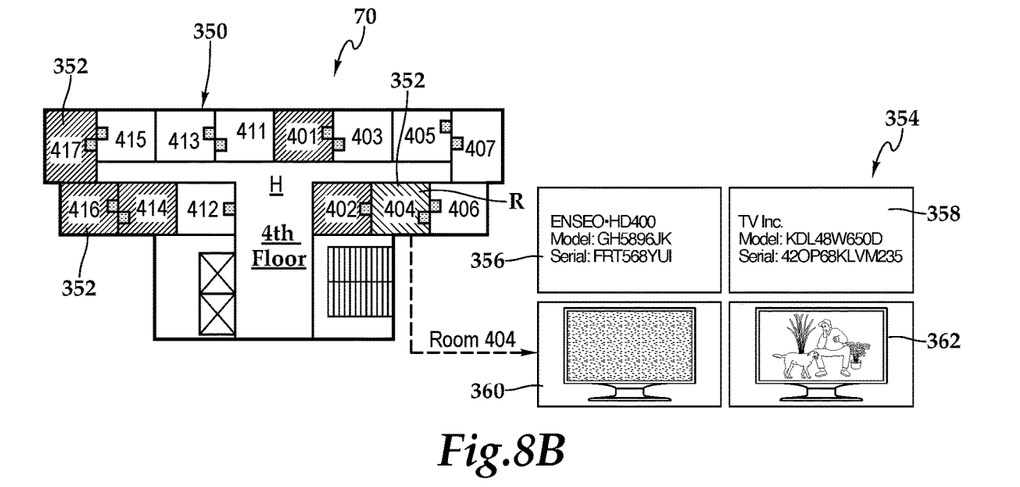
FIG. 8B is a schematic diagram depicting one embodiment of a map representation of a floor of the hospitality lodging establishment presented in FIG. 8A.

Referring now to FIG. 8A and FIG. 8B, in one implementation, property monitoring and optimization is provided in the form of a database, or as shown, in the map view 70 of the hospitality establishment H including a graphical presentation 350 of a floor of the hospitality establishment H, wherein particular hotel rooms with set-top box data historically and in substantially real time permits a user or manager to select the desired information and make optimal property management decisions. In particular, color-coding and hue assignment adds additional understanding and visibility into housekeeping and maintenance conditions as well as use. By way of example and not by way of limitation, the hospitality establishment is graphical depicted as having a lobby and ten floors, which are lobby, $2^{nd}$ floor, 3rd floor, etc. For each floor, such as the $4^{th}$ floor, a floor layout is shown with rooms, such as rooms 401 through 407 and 411 through 417. In FIGS. 8A and 8B, by collecting the substantially real time and historic set-top box data from the field, a map may be shown depicting all rooms with an outstanding data status 352, for example. In particular, room 404 from FIG. 1 is highlighted to inspect the data status, which may include the physical data 52, the physical quality assurance data 54, the program data 56, the program quality assurance data 58, the interactive data 60, the environmental data 62, the identification data 64, the self-diagnostic data 66, or any subset or combination thereof. With this information and knowledge of the issue, management may appropriately administer the strategy for organizing and coordinating the resources of the property. As mentioned, it should be appreciated that other types of databases and charts may be prepared from the substantially real-time information collected.

As shown, by way of example, the status of Room 404 is being examined as each highlighted room 352 is experiencing a problem as indicated by self-diagnostic data 66 received by the server 80. As shown, the graphical representation of Room 404 is annotated with information group 354. For example, information 356 is based on identification data 64 that details the model and serial number of the set-top box associated with the Room 404. Also, included in the annotation is information 358, which is based on the physical data 52 and provides details on the physical connection with the display associated with the set-top box of Room 404. Information 360 shows details on a particular recently viewed channel that is not being received clearly as the self-diagnostic data 66 indicates. Information 362 annotates the map view 70 with the current channel that is being viewed by the guest, based on the interactive data 60. That is, in some embodiments, once the set-top box data is captured, the set-top box is directly uploaded to the server and a database and then associated with the rooms shown on the map view 70. Management uses the map view 70 to gather real time information about the status of the rooms and properties and reports on any failures. To view the set-top box data captured from each set-top box in each room, the map view users can select a room from the map and appropriately click or tap on the rooms and then select the set-top box data or other processing operations requested.

The system presented herein provides for the management of hospitality real estate and to the operation, control, and oversight of hospitality properties, such as lodging establishments, motels, or hotels, for example. In one embodiment, a web-hosted, cloud-based property monitoring and troubleshooting tool is furnished that provides a graphical presentation of the hospitality properties with historic and real time room and equipment status. By way of example and not by way of limitation, the user may select to annotate the map view with rooms and equipment online/offline, rooms and equipment percentage online status, groups by percentage, rooms and equipment that are powered off, rooms and equipment TV control status and TV types by model number, rooms and equipment with TV output errors or rooms and equipment with HDCP errors. Also, possible instructions include to show rooms and equipment by firmware version numbers, show rooms and equipment by UI software version numbers, show rooms and equipment by settings version numbers, show rooms that are tuned to the welcome channel, show rooms that are tuned to a TV channel and group them by channels, show rooms with program guide trouble, show room set top box memory usage, show room self-test results, show rooms with self-test failures, force self-test, view the self-test result, view rooms with failure, force software update, force UI software update, force configuration change or force power state change. The user may utilize the annotated map view to effect commands to one or more rooms including online/offline, network address, MAC address, hardware configuration and identifiers, software configuration and versions, TV connection status, control interface and HDMI interface or unit up-time and health reports, for example. The user may also utilize the system for full access to debug console ports on each set-top box. As mentioned, historic set-top box data may be viewed by property or properties, room or room, with user selectable constraints such as data and time. Further, the system may be utilized to monitor the installation process.

Figure 9:
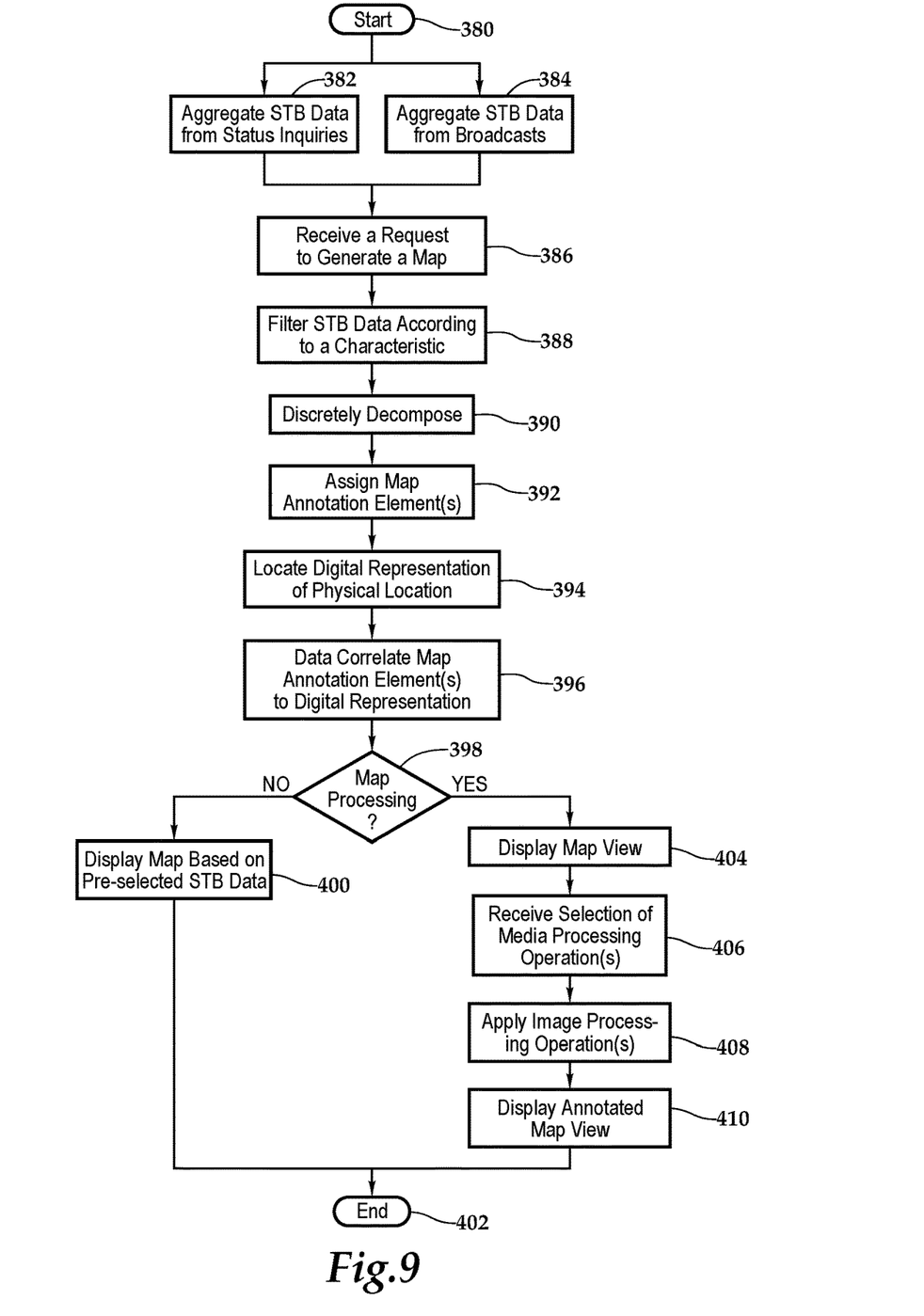
FIG. 9 is a flow chart depicting one embodiment of a method for providing hospitality property management according to the teachings presented herein.

Referring now to FIG. 9, one embodiment of a method for utilizing property management tools for the operation, control, and oversight of hospitality properties, such as lodging establishments, motels, or hotels, for example, is depicted. The methodology starts at block 380 and progresses through block 382 where, respectively set-top box data is aggregated from status inquiries from the server to the set-top boxes and aggregated from set-top boxes broadcasting the set-top box data. At block 386, the server receives a request to generate a map view of a particular hospitality property. At block 388, the server filters the aggregated set-top box data according to a characteristic or characteristics. At blocks 390 and 392, the set-top box data is discretely decomposed and assigned annotation elements. At block 394, the digital representation of the physical location, e.g., the hospitality property, is located and at block 396, the data correlation of the map annotation elements to the digital representation occurs.

At decision block 398, if the map processing including any applied annotations are based on a pre-selected or pre-stored or pre-defined criteria, then the methodology advances to block 400 where the appropriate map view is rendered prior to block 402, the methodology ending. On the other hand, at decision block 398, if user input will be sought on the map view and annotations, then the methodology displays the map view at block 404. Then at block 406, the server receives selection of media processing operations from the user and then applies the image processing operations at block 408. The media processing operations may include, for example, selecting the media to be displayed and various luminance and color properties and such to provide further visibility into the map view. At block 410, the map view with annotations is rendered prior to the methodology ending at block 402.

The order of execution or performance of the methods and data flows illustrated and described herein is not essential, unless otherwise specified. That is, elements of the methods and data flows may be performed in any order, unless otherwise specified, and that the methods may include more or less elements than those disclosed herein. For example, it is contemplated that executing or performing a particular element before, contemporaneously with, or after another element are all possible sequences of execution.

While this invention has been described with reference to illustrative embodiments, this description is not intended to be construed in a limiting sense. Various modifications and combinations of the illustrative embodiments as well as other embodiments of the invention, will be apparent to persons skilled in the art upon reference to the description. It is, therefore, intended that the appended claims encompass any such modifications or embodiments.

What is claimed is:

1. A system for property management, the system comprising:
   room data including at least two of physical quality assurance data, program quality assurance data, interactive data, and environmental data, the room data being associated with an entertainment center in a room at an establishment having a plurality of rooms;
   the physical quality assurance data being, relative to the entertainment center, physical state data of a current condition of a hardware and cable connections;
   the program quality assurance data being, relative to the entertainment center, software state data of current operations of a system software and an application software;
   the interactive data being, relative to the entertainment center, information about guest-display-based interactions with the entertainment center;
   the environmental data being, relative to the entertainment center, information about guest-non-display-based interactions with the entertainment center; and
   a server located remote to the room, the server including:
      a housing securing inputs, outputs, a processor, memory, and storage therein,
      a busing architecture communicatively interconnecting the inputs, the outputs, the processor, the memory, and the storage, and
      the memory accessible to the processor, the memory including processor-executable instructions that, when executed, cause the processor to:
         receive the room data,
         render a map view of the establishment based on obtained map data, the map view including a graphical representation of the room and a plurality of other rooms at the establishment, and
         annotate the graphical representation of the room with at least a portion of the room data.

2. The system as recited in claim 1, wherein the establishment is selected from the group consisting of furnished multi-family residences, dormitories, lodging establishments, hotels, hospitals, and multi-unit environments.

3. The system as recited in claim 1, wherein the processor-executable instructions of the server further comprise processor-executable instructions that, when executed, cause the processor to render a 3-D perspective view of the establishment.

4. The system as recited in claim 1, wherein the processor-executable instructions of the server further comprise processor-executable instructions that, when executed, cause the processor to render a multi-floor view of the establishment.

5. The system as recited in claim 1, wherein the processor-executable instructions of the server further comprise processor-executable instructions that, when executed, cause the processor to render a 2-D top plan view of at least a portion of the establishment.

6. The system as recited in claim 1, wherein the processor-executable instructions of the server further comprise processor-executable instructions that, when executed, cause the processor to render a map view of a floor of the establishment.

7. The system as recited in claim 1, wherein the room data further comprises identification data, the identification data including a location of the entertainment center.

8. The system as recited in claim 1, wherein the room data further comprises self-diagnostic data, the self-diagnostic data being information relative to faults in the physical quality assurance data, the program quality assurance data, the interactive data, and the environmental data.

9. The system as recited in claim 1, wherein the entertainment center further comprises a television.

10. The system as recited in claim 1, wherein the entertainment center further comprises a display.

11. The system as recited in claim 1, wherein the entertainment center further comprises a set-top box.

12. The system as recited in claim 1, wherein the entertainment center further comprises an integrated set-top box and display.

13. The system as recited in claim 1, wherein the physical quality assurance data is selected from the group consisting of online/offline status, power state, display control status, display connection status, HDMI interface status, control interface status, memory usage, unit up-time, and hardware installation progress.

14. The system as recited in claim 1, wherein the program quality assurance data is selected from the group consisting of program guide status, debug console log, software usage, and software installation progress.

15. The system as recited in claim 1, wherein the interactive data is selected from the group consisting of guest configuration data, television channel viewing, program viewing, Internet history, and program guide interaction.

16. The system as recited in claim 1, wherein the environmental data is selected from the group consisting of amenity interaction, lighting status, thermostat status, window shades status, and door status.

17. A system for property management, the system comprising:
room data including at least two of physical quality assurance data, program quality assurance data, and interactive data, the room data being associated with an entertainment center in a room at an establishment having a plurality of rooms;
the physical quality assurance data being, relative to the entertainment center, physical state data of a current condition of a hardware and cable connections;
the program quality assurance data being, relative to the entertainment center, software state data of current operations of a system software and an application software;
the interactive data being, relative to the entertainment center, information about guest-display-based interactions with the entertainment center; and
a server located remote to the room, the server including:
a housing securing inputs, outputs, a processor, memory, and storage therein,
a busing architecture communicatively interconnecting the inputs, the outputs, the processor, the memory, and the storage, and
the memory accessible to the processor, the memory including processor-executable instructions that, when executed, cause the processor to:
receive the room data,
render a map view of the establishment based on obtained map data, the map view including a graphical representation of the room and a plurality of other rooms at the establishment, and
annotate the graphical representation of the room with at least a portion of the room data.

18. The system as recited in claim 17, wherein the entertainment center further comprises a device selected from the group consisting of televisions, displays, set-top boxes, and integrated set-top boxes and displays.

19. A system for property management, the system comprising:
room data including at least two of physical quality assurance data, program quality assurance data, and environmental data, the room data being associated with an entertainment center in a room at an establishment having a plurality of rooms;
the physical quality assurance data being, relative to the entertainment center, physical state data of a current condition of a hardware and cable connections;
the program quality assurance data being, relative to the entertainment center, software state data of current operations of a system software and an application software;
the environmental data being, relative to the entertainment center, information about guest-non-display-based interactions with the entertainment center; and
a server located remote to the room, the server including:
a housing securing inputs, outputs, a processor, memory, and storage therein,
a busing architecture communicatively interconnecting the inputs, the outputs, the processor, the memory, and the storage, and
the memory accessible to the processor, the memory including processor-executable instructions that, when executed, cause the processor to:
receive the room data,
render a map view of the establishment based on obtained map data, the map view including a graphical representation of the room and a plurality of other rooms at the establishment, and
annotate the graphical representation of the room with at least a portion of the room data.

20. The system as recited in claim 19, wherein the entertainment center further comprises a device selected from the group consisting of televisions, displays, set-top boxes, and integrated set-top boxes and displays.

* * * * *